UNITED STATES PATENT OFFICE.

CHARLES TEAGUE, OF FRESNO, CALIFORNIA.

COMPOSITION OF MATTER TO BE USED AS A CONFECTION.

1,173,619.

Specification of Letters Patent. Patented Feb. 29, 1916.

No Drawing. Application filed June 1, 1915. Serial No. 31,364.

*To all whom it may concern:*

Be it known that I, CHARLES TEAGUE, a citizen of the United States, and a resident of the city of Fresno, county of Fresno, and State of California, have invented a new and useful Composition of Matter to be Used as a Confection, of which the following is a specification.

This composition consists of the following ingredients in the approximate proportions stated herein, viz: cleansed figs, 20 pounds; syrup of ginger, 1 pound; sugar, 1 pound.

I prepare this confection by placing the cleansed figs, syrup of ginger, and sugar in a vessel, and heating them together until the ginger and sugar thoroughly permeate the figs. The relative proportions of figs, ginger and sugar can be varied to suit different tastes, and instead of the syrup of ginger ordinary dry ginger, or tincture of ginger can be used with an additional quantity of sugar or syrup. Or, this confection can be prepared by mixing the ingredients without cooking, or by placing such mixed ingredients in the sun under sanitary conditions as is usual in cooking preserves, or by heating the syrup and pouring it over the cleansed raw figs.

I claim as my invention:

The herein described confection consisting of cleaned figs approximately 20 pounds, sugar approximately one pound and syrup of ginger, approximately one pound, heated together until the ginger and sugar thoroughly permeates such figs, all substantially as described.

CHAS. TEAGUE.

Witnesses:
L. N. BARBER,
L. HUGHES.

Copies of this patent may be obtained for five cents each, by addressing the "Commissioner of Patents, Washington, D. C."